United States Patent [19]

Moore et al.

[11] Patent Number: 5,438,133
[45] Date of Patent: Aug. 1, 1995

[54] CYCLODEXTRIN CATENANE COMPOUNDS CAPABLE OF FORMING INCLUSION COMPLEXES

[75] Inventors: Christopher P. Moore, Harrow; Trevor J. Wear, South Harrow; James F. Stoddart; Dominique Armspach, both of Edgbaston, all of United Kingdom

[73] Assignee: Eastman Kodak Company, Rochester, N.Y.

[21] Appl. No.: 190,010

[22] PCT Filed: May 24, 1993

[86] PCT No.: PCT/EP93/01295

§ 371 Date: Jan. 27, 1994

§ 102(e) Date: Jan. 27, 1994

[87] PCT Pub. No.: WO93/24532

PCT Pub. Date: Sep. 12, 1993

[30] Foreign Application Priority Data

May 30, 1992 [GB] United Kingdom ............... 9211573

[51] Int. Cl.[6] ............................................. C08B 37/16
[52] U.S. Cl. ................................... 536/103; 536/124; 540/450; 540/451; 540/454; 540/460; 540/467; 540/470; 540/474
[58] Field of Search ............... 536/103, 124; 540/450, 540/451, 454, 460, 467, 470, 474

[56] References Cited

U.S. PATENT DOCUMENTS 4,212,953 7/1980 Sheratte et al. .................. 521/137
4,514,620 4/1985 Cheng et al. ..................... 219/553
4,599,327 7/1986 Nogradi et al. ................... 514/58
4,853,090 8/1989 Daniel et al. ................... 204/153.15
5,070,081 12/1991 Majid et al. ...................... 514/58
5,302,729 4/1994 Gibson et al. .................... 549/349

OTHER PUBLICATIONS

Angewandte Chem. Int. Ed. NGL, vol. 18, No. 8, 1979, Weinheim, pp. 623–624, F. Vogtle et al, "Complexes of gamma–Cyclodextrin with Crown Ethers, Cryptands, Coronates, and Cryptates".

Chemical & Engineering News, vol. 70, No. 15, 13 Apr. 92, Washington, D.C., pp. 39–40, Ron Dagani, "Polymer Chains Threaded with many Dextrin Rings".

Chemistry in Britain, vol. 27, No. 8, 1 Aug. 91, London, pp. 714–718, Fraser Stoddart, "Making Molecules to Order".

Database WPI, Week 9205, Derwent Publications Ltd., London GB, AN 36465 & JP-A-32,282,348 (Sanyo Electric KK) 12 Dec. 91—Abstract.

*Primary Examiner*—Douglas W. Robinson
*Assistant Examiner*—Kathleen Kahler Fonda
*Attorney, Agent, or Firm*—J. Jeffrey Hawley

[57] ABSTRACT

Cyclodextrin catenanes capable of forming inclusion complexes and a method of preparing them are disclosed. The catenanes comprise one or two per-2,6-di-O-alkyl-$\beta$-cyclodextrin macrocyclse wherein each per-2,6-di-O-alkyl-$\beta$-cyclodextrin macrocycle is interpenetrated by another macrocycle. Such modified cyclodextrins may be used for the electrochemical and optical sensing of small organic molecules, especially small aromatic molecules.

7 Claims, No Drawings

CYCLODEXTRIN CATENANE COMPOUNDS CAPABLE OF FORMING INCLUSION COMPLEXES

The invention relates to compounds capable of forming inclusion complexes. More particularly, it relates to modified cyclodextrins.

It is known that cyclodextrins are able to form inclusion complexes with a variety of organic and inorganic compounds. The three most important cyclodextrins are the α-, β- and γ-cyclodextrins, which respectively consist of six, seven and eight α-D-glucopyranosyl residues. The ability of a cyclodextrin to form a complex is regulated by the size of the cavity produced by the ring of α-D-glucopyranosyl residues of which it is composed.

Modified cyclodextrins have been prepared in which the hydroxyl groups have been partially or totally replaced by methyl groups. Such modification is responsible for an extension of the hydrophobic cavity of the cyclodextrin. Other modified cyclodextrins have been reported in which the cavity space has been restricted by the attachment of one or more relatively large chemical groups e.g. naphthyl groups to the cyclodextrin rim. A review of inclusion complexes formed by cyclodextrins which includes a discussion of modified cyclodextrins is presented by R. J. Clarke, J. H. Coates and S. F. Lincoln, *Advances in Carbohydrate Chem. and Biochem.*, 1988, 46, 205.

It is difficult to alter the properties of cyclodextrins by simple and selective modification of the hydroxyl groups and there is a continuing need for alternative modified cyclodextrins. Different methods of adjusting the physical, electronic and receptor properties of cyclodextrins are sought. In particular, different ways of controlling cavity size are required.

The invention provides a modified cyclodextrin in which the cavity size has been altered by the formation of a catenane. The catenane is characterised in that an optionally substituted cyclodextrin is one of the interpenetrating macrocycles. In this way, the properties of the cyclodextrin have been modified without necessitating selective chemical modification of the cyclodextrin's functional groups.

Such modified cyclodextrins may be used for the electrochemical and optical sensing of small organic molecules, especially small aromatic molecules.

The invention provides a cyclodextrin catenane comprising one or two per-2,6-di-O-alkyl-β-cyclodextrin macrocycles and another macrocycle wherein each per-2,6-di-O-alkyl-β-cyclodextrin macrocycle is interpenetrated by the other macrocycle which has the formula

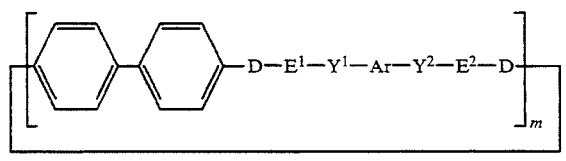

I wherein
D represents —CH$_2$— or —CO—;
E$^1$ represents —(XCH$_2$CH$_2$)$_n$—;
E$^2$ represents —(CH$_2$CH$_2$X)$_n$—;
each X independently represents —O— or —NR—;
Y$^1$ represents —NRCO—, —NRSO$_2$—, —SCO— or —SSO$_2$—;
Y$^2$ represents —CONR—, —SO$_2$NR—, —COS— or —SO$_2$S—;
R represents hydrogen or alkyl, preferably having from 1 to 3 carbon atoms;
Ar is an aromatic group;
n is an integer from 4 to 6; and,
m is 1 or 2, provided that when the catenane comprises two per-2,6-di-O-alkyl-β-cyclodextrin macrocycles then m is 2.

Suitable R groups include methyl, ethyl and propyl.

Suitable Ar groups include substituted or unsubstituted arylene, bisarylene and arylenealkylenearylene e.g. phenylene, naphthylene, biphenylene and phenylenemethylenephenylene.

Preferred compounds include those in which D represents —CH$_2$—, each X represents —O—, Y$^1$ represents —NHCO—, Y$^2$ represents —CONH—, Ar represents 1,4-phenylene or 4,4'-biphenylene, n is 4 and m is 1.

Other preferred compounds include those in which D represents —CO—, E$^1$ is —(NHCH$_2$CH$_2$)(OCH$_2$CH$_2$)$_3$—, E$^2$ is —(CH$_2$CH$_2$O)$_3$(CH$_2$CH$_2$NH)—, Y$^1$ represents —NHCO—, Y$^2$ represents —CONH—, Ar represents 1,4-phenylene and m is 1.

Compounds of the invention may be prepared by reaction, in aqueous solution, of (a) per-2,6-di-O-alkyl-β-cyclodextrin, (b) a compound having the formula

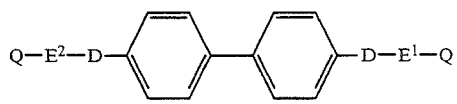

II wherein Q represents —NHR or —SH and D, E$^1$ and E$^2$ are as hereinbefore defined; and (c) a compound having the formula Z—Ar—Z wherein Ar is as hereinbefore defined and Z represents —COCl or —SO$_2$Cl; the reaction being carried out under conditions which facilitate the ring closure of (b) by reaction with (c).

The reactants (a), (b) and (c) may be employed in substantially equimolar amounts.

For example, when Q is —NH$_2$ and Z is —COCl, the reaction may be carried out in moderately basic aqueous solution, preferably at pH 10-11, at room temperature.

A mixture of products is produced which includes the desired catenane compound or compounds. The catenane compounds are readily purified e.g. using chromatographic techniques.

The invention is further illustrated by way of specific example as follows.

General Experimental Procedures

All chemicals were purchased from Aldrich except for impure per-2,6-O-methyl-β-cyclodextrin provided by Teijin Ltd (Japan).

Developed TLC plates (silica gel 60 F, Merck 5554) were examined under ultra violet light, sprayed with 5% conc. H$_2$SO$_4$ in EtOH and developed by heating in an oven to detect any presence of carbohydrates.

F.A.B. mass spectra were performed using a primary atom beam of Xe (8 keV) on a Kratos MS 80 instrument with m-nitrobenzyl alcohol or glycerol as the matrix. E.I. mass spectra were recorded on a Kratos MS 25 instrument.

$^1$H NMR and $^{13}$C NMR spectra were recorded on a Brucker WH-400 spectrometer (400.1 MHz), or on a Brucker AM-250 (250.1 MHz) spectrometer. In the presentation of the $^1$H NMR data the following abbreviations have been used: s=singlet; d=doublet; t=triplet; m=multiplet. All chemical shifts are quoted in ppm on the δ scale. All NMR spectra were referenced to tetramethylsilane (T.M.S.) using either the solvent resonance or internal T.M.S. Coupling constants (J-values) are expressed in Hertz (Hz).

Example 1

Compound Preparations: 4,4'bis[bromomethyl]-1,1'-biphenyl

To 4,4'-dimethyl-1,1'-biphenyl (20.0 g, 0.11 mol) and N.B.S. (78.0 g, 0.246 mol) dissolved in CCl$_4$ (500 ml), was added benzoylperoxide (0.05 g, 0.2 mmol). The reaction mixture was stirred for 6 h under reflux. The hot suspension was then filtered. The filtrate was evaporated to dryness and the residue partitioned between CHCl$_3$ (100 ml) and H$_2$O (100 ml). The organic layer was washed repeatedly with H$_2$O, and dried (MgSO$_4$). Removal of the solvent under reduced pressure gave a white solid which was purified by recrystallisation in acetone to give 4,4'bis [bromomethyl]-1,1'-biphenyl as colourless crystals (10.8 g, 29%, mp: 166°-168° C.) (lit, 169.5°-171.5° C.): m/z (positive-ion F.A.B.M.S.), 340[M]+, (C$_{14}$H$_{12}$Br$_2$ requires M, 340); $^{67}$H (CDCl$_3$, 250 MHz) 4.55 (4H,s,—CH$_2$Br), 7.43–7.50 (4H,m,β-biphenyl protons), 7.54–7.59 (4H,m.α-biphenyl protons).

4,4'bis{-1,1-[2-(2-(2-(2-hydroxyethoxy)ethoxy)ethoxy)ethoxy]methylene}-1,1'-biphenyl To tetraethyleneglycol (161.7 ml, 1.09 mol) was added sodium metal (2.7 g. 0.117 mol) under an atmosphere of nitrogen at room temperature.

The reaction mixture was stirred at 60° C. until total dissolution of sodium whereupon powdered 4,4'-bis[-bromomethyl]-1,1'-biphenyl (10 g, 0.029 mol) was added. After stirring for 18 h at 60° C. and subsequent cooling to room temperature, H$_2$O (200 ml) and CHCl$_3$ (100 ml) were added to the mixture. The aqueous phase was further extracted with CHCl$_3$ (2×100 ml). The combined CHCl$_3$ extracts were then respectively washed with water (5×100 ml), and saturated sodium chloride solution (100 ml) before being dried over MgSO$_4$. Removal of the solvent in vacuo gave a pale yellow oil which was purified by column chromatography on silica gel (MeOH:CHCl$_3$, 8:92) to give 4,4'-bis{-1,1-[2-(2-(2-(2-hydroxyethoxy)ethoxy)ethoxy)ethoxy]-methylene}-1,1'-biphenyl as a colourless oil (12.5 g, 76%); m/z (positive-ion F.A.B M.S ), 605 for [M+K]+, 589 for [M+Na]+, 567 for [M+H]+ (C$_{30}$H$_{46}$O$_{10}$ requires M, 566); $^{\delta}$H (250 MHz, CDCl$_3$) 2.63 (2H,s,OH), 3.55–3.76 (32H,m,16x—CH$_2$O—), 4.60 (4H,s,—ArCH$_2$O), 7.39 (4H,d,J=7.5 Hz, α-biphenyl protons), 7.55 (4H,d,J=7.5 Hz, β-biphenyl protons).

4,4'-bis{-1,1-[2-(2-(2-(2-{toluene-p-sulphony}ethoxy)ethoxy)ethoxy]methylene}-1,1'-biphenyl To a mixture of sodium hydroxide (2 g, 0.5 mol) in water (10 ml) and 4,4'-bis{-1,1-[2-(2-(2-(2-hydroxyethoxy)ethoxy)ethoxy)ethoxy]methylene}-1,1'-biphenyl (10 g, 0.176 mol) in THF (10 ml), was added dropwise under stirring a solution of p-toluenesulphonyl chloride (7.6 g, 0.04 mol) in THF (10 ml) at 0°–5° C. The mixture was further stirred for 2 h at the same temperature. After addition of water (100 ml), the reaction mixture was extracted with CHCl$_3$ (3×50 ml). The organic extract was washed twice with water (2×100 ml) and once with a saturated sodium chloride solution (100 ml) before being dried over MgSO$_4$. Removal of the solvent gave 4,4'-bis{-1,1-[2-(2-(2-(2-{toluene-p-sulphonyl}ethoxy)ethoxy)ethoxy)ethoxy]methylene}-1,1'biphenyl as a pale yellow oil (14.5 g, 94%), m/z (positive-ion F.A.B.M.S.), 897 for [M+Na]+, 874 for [M]+, (C$_{44}$H$_{58}$S$_2$O$_{14}$ requires M, 874); $^{\delta}$H(250 MHz, CDCl$_3$) 2.43 (6H,s,2x ArCH$_3$), 3.57–3.72 (28H,m, 14x —CH$_2$O—), 4.16 (4H,t,J=5.5 Hz, 2x—CH$_2$OTs), 4.60 (4H,s,2x—ArCH$_2$O—), 7.33 (4H,d,J=7.5 Hz,β-biphenyl protons), 7.41 (4H,d,J=7.5 Hz, α-biphenyl protons), 7.53–7.82 (8H, 2x d, J=7.5 Hz, p-toluenesulphonyl protons).

4,4'bis{-1,1-[2-(2-(2-(2-{phthaloylamino}ethoxy)ethoxy)ethoxy)ethoxy]methylene}-1,1'-biphenyl To a solution of the ditosylate (14 g, 0.0159 mol) in dry DMF, was added powdered potassium phthalimide (10.7 g, 0.037 mol) under an atmosphere of N$_2$. The reaction mixture was stirred for 7 h at 90° C. before being poured into water (100 ml) and extracted with CHCl$_3$ (3×75 ml). The organic extract was washed with NaOH 0.1N (100 ml), water (100 ml), and dried over MgSO$_4$. Removal of the solvent gave 4,4'-bis{-1,1-[2-(2-(2-(2-{phthaloylamino}ethoxy)ethoxy)ethoxy)ethoxy]methylene}-1,1'-biphenyl as a pale yellow oil (12.1 g, 92%); m/z (positive-ion F.A.B.M.S.), 847 for [M+Na]+; 824 for [M]+; (C$_{46}$H$_{52}$N$_2$O$_{12}$ requires M, 824); $^{\delta}$H (250 MHz, CDCl$_3$) 3.58–3.69 (24H, m, 12x—CH$_2$O—), 3.73 (4H,t,J=5 Hz, —CH$_2$N=), 3.90 (4H,t,J=5 Hz, —CH$_2$CH$_2$N=), 4.59 (4H,s,—ArCH$_2$O—), 7.40 (4H,d,J=8 Hz, β-biphenyl protons), 7.55 (4H,d,J=8 Hz, α-biphenyl protons), 7.68–7.85 (8H,m, phthaloyl protons).

4,4'-bis{-1,1-[2-(2-(2-(2-aminoethoxy)ethoxy)ethoxy)ethoxy]methylene]-1,1'-biphenyl A mixture of the diphthalimide (12 g, 0.0145 mol) and hydrazine hydrate (7.4 ml, 0.146 mol) in methanol (250 ml) was refluxed for 1 h. After cooling to room temperature, the solution was diluted with water (50 ml) and concentrated under reduced pressure. To the residual solution, was added concentrated HCl (20 ml). The mixture was stirred for 0.5 h, subsequently treated with NaOH 2N (75 ml) and extracted with CHCl$_3$ (3×100 ml). The organic layer was dried over MgSO$_4$. Removal of the solvent gave an orange oil which was purified by column chromatography on silica gel (CHCl$_3$:MeOH:NH$_4$OH, 40:9:1) to give 4,4'-bis{-1,1-[2-(2-(2-(2-aminoethoxy)ethoxy)ethoxy)ethoxy]methylene}-1,1'-biphenyl as a yellow oil (3.68 g, 45%); m/z (positive-ion F.A.B.M.S.), 587 for [M+Na]+, 565 for [M+H]+ (C$_{30}$H$_{48}$N$_2$O$_8$ requires M, 564); $^{\delta}$H (250 MHz, CDCl$_3$) 2.80 (4H,broad s,NH$_2$), 3.52 (4H,t,J=5 Hz, 2x —CH$_2$NH$_2$), 3.62–3.72 (28H, m,14x —CH$_2$O—), 7.43 (4H,d,J=8 Hz, β-biphenyl protons), 7.58 (4H,d,J=8 Hz, α-biphenyl protons).

Per-2,6-O-methyl-β cyclodextrin 3-heptabenzoate (DMβCD-B$_7$)

Distilled benzoyl chloride (70 ml) was added to a solution of the mixture (4.69, 3.5 mmol) of methylated cyclodextrin in dry pyridine (105 ml). The dark red solution was stirred at 40°–50° C. under nitrogen for 4 days and the resulting solution was evaporated to dryness under high vacuum. The black tar obtained was dissolved (with cooling) in methanol (100 ml) and the solution was stirred for 1 h at room temperature before being evaporated to dryness under high vacuum. The residue was dissolved in CHCl$_3$ washed with water, dried over MgSO$_4$, and evaporated to dryness to yield a dark brown solid. Chromatography on silica gel with acetone as eluant afforded 2,6-Per-O-methyl-$\beta$ cyclodextrin 3-heptabenzoate (DM$\beta$CD-B$_7$) (2.1 g, 30%), m.p. 134°–136° C.; m/z (positive-ion F.A.B.M.S.), 2082 for [M+Na]$^+$(C$_{105}$H$_{126}$O$_{42}$ requires M, 2058); $\delta$H (250 MHz, CD$_3$COCD$_3$) 2.69 (21H,s, 2-O—Me), 3.25 (7H,dd,J$_{1,2}$=3.5 Hz, J$_{2,3}$=10 Hz, H-2), 3.39 (21H,s, 6-O—Me), 3.67 (7H,dd,J$_{5,6a}$=1.5 Hz, J$_{6a,6b}$=11 Hz, H-6a), 3.85 (7H, dd, J$_{3,4}$=9.5 Hz, J$_{4,5}$=9.5 Hz, H-4), 4.01 (7H,dd,J$_{5,6}$=4.0 Hz, J$_{6a,6b}$=11 Hz, H-5), 5.03 (7H,d,J$_{1,2}$=3.5 Hz, H-1), 5.61 (7H,dd,J$_{2,3}$=10 Hz, J$_{3,4}$=9.5 Hz, H-3), 7.31 (14H,dd with second order perturbation, J$_{o,m}$=7 hz, J$_{m,p}$=7 hz, m-H), 7.42 (7H,tt,J$_{m,p}$=7 Hz, J$_{o,p}$2.0 Hz, p-H), and 8.05 (14H, d with second order perturbation, J$_{o,m}$=7.0 Hz, o-H).

Per-2,6-O-methyl-$\beta$ cyclodextrin (DM$\beta$CD)

To a solution of DM$\beta$CD-B$_7$ (1.6 g, 0.77 mmol) in methanol (100 ml) was added potassium hydroxide 6N solution (10 ml) and the mixture was stirred at room temperature for 18 h. The solvents were removed under reduced pressure and the residue was dissolved in water (75 ml). The aqueous solution was extracted with ether (2×50 ml) and subsequently with CHCl$_3$ (3×50). The chloroform extract was washed with saturated sodium chloride solution (2×50 ml), dried (MgSO$_4$), and evaporated to dryness. The residue was subjected to chromatography (silica gel; CHCl$_3$: MeOH, 93:7) to afford Per-2,6-O-methyl-$\beta$ cyclodextrin (DM$\beta$CD) (0.71 g, 70%), m.p.>270° C.; m/z (positive-ion F.A.B.), 1353 for [M+Na]$^+$. (C$_{56}$H$_{98}$O$_{35}$ requires M, 1330); $\delta$H (250 MHz; C$_6$D$_6$) 3.21 (7H,dd,J$_{1,2}$=3.7 Hz,J$_{2,3}$=9.3 Hz, H-2), 3.29 (21H,s, 6-O—Me), 3.51 (21H,s, 2-O—Me), 3 62 (7H,dd,J$_{3,4}$=9.1 Hz, J$_{4,5}$=10 Hz, H-4), 3.76 (7H,dd,J$_{5,6a}$=1.7 Hz, J$_{6a,6b}$=10.6 Hz, H-6a), 3.84 (7H,dd,J$_{5,6b}$=4.6 Hz, J$_{6a,6b}$=10.6 Hz, H-6b), 4.10 (7H, m, J$_{4,5}$=10 Hz, H-5), 4.45 (7H,dd,J$_{2,3}$=9.4 Hz, J$_{3,4}$=9.1 Hz,H-3), 4.93 (7H,d,J$_{1,2}$=3.7 Hz, H-1,5.44 (7H,s,OH).

1,4,7,10,25,28,31,34-octaoxa-13,22-diaza[15,15,0-]paracyclophane-14,21-dione;

1,4,7,10,25,28,31,34,49,52,55,58,73,76,79,82-hexadodecaoxa-13,22,61,70-tetraaza[15.15.0.15.15.0-]paracyclophane-14,21,62,71-tetraone;

{[2][1,4,7,10,25,28,31,34-octaoxa-13,22-diaza[15.15.0-]paracyclophane-14,21-dione][Per-2,6-O-methyl-$\beta$ cyclodextrin]-catenane};

{[2][1,4,7,10,25,28,31,34,49,52,55,58,73,76,79,82-hexadodecaoxa-13,22,61,70-tetraaza[15.15.0.15.15.0-]paracyclophane-14,21,62,71-tetraone][Per-2,6-O-methyl-$\beta$ cyclodextrin]-catenane}; and {[3][1,4,7,10,25,28,31,34,49,52,55,58,73,76,79,82-hexadodecaoxa-13,22,61,70-tetraaza[15.15.0.15.15.0]-paracyclophane-14,21,62,71-tetraone]Bis-[Per-2,6-O-methyl-$\beta$ cyclodextrin]-catenane} ("head to head" and "head to tail" isomers).

A mixture of 4,4-bis{-1,1-[2-(2-(2-(2-aminoethoxy)ethoxy)ethoxy)ethoxy]methylene}-1,1'-biphenyl (0.2 g, 0.354 mmol), pure DM$\beta$CD (0.5 g, 0,375 mmol) and NaOH (0.04 g, 1 mmol) in distilled water (100 ml) was sonicated for 2 h at room temperature. To this solution, was then added powdered terephthaloylchloride (0. 072 g, 0. 356 mmol) while keeping the temperature below 5° C. The suspension was sonicated for a further 2 h at room temperature. The reaction mixture was extracted with CHCl$_3$. The organic extract was washed with dilute HCl, water and finally dried over MgSO$_4$. Removal of the solvent under reduced pressure gave a colorless solid containing mainly Per-2,6-O-methyl-$\beta$ cyclodextrin which was purified by chromatography on silica gel (MeOH: CHCl$_3$,8:92) to afford four fractions.

Fraction (i) was per-2,6-O-methyl-$\beta$ cyclodextrin.

Fraction (ii) was 1,4,7,10,25,28,31,34,-octaoxa-13,22-diaza[15,15,0]paracyclophane-14,21-dione (30 mg, 12%, m.p.: 134°–135° C.); m/z (positive-ion F.A.B.M.S., 717 for [M+Na]$^+$; 695 for (M+H]$^+$; (C$_{38}$H$_{50}$N$_2$O$_{10}$ requires M, 694); $^{67}$H (400 MHz, CDCl$_3$) 3.58–3.72 (32H,m, 14x —CH$_2$O and 2x CH$_2$NHCO—), 7.35 (4H,d,J=8 Hz, $\beta$-biphenyl protons) , 7.41 (4H,d,J=8 Hz, $\alpha$-biphenyl protons), 7.70 (4H, s, phenyl protons); $\delta$C. (75.5 MHz, CDCl$_3$) 39.92, 69.41, 69.81, 70.25, 70.55, 70.60, 70.66, 72.87, 126.87, 127.18, 128.28, 136.77, 137.20, 139.96, 166.53.

Fraction (iii) was further purified by preparative T.L.C. on silica gel (CH$_2$Cl$_2$:MeOH, 91:9) to give two products: (iii') and (iii"). They were characterised as:

(iii') 1,4,7,10,25,28,31,34,49,52,55,58,73,76,-79,82-hexadodecaoxa-13,22,61,70-tetraaza-[15.15.0.15.15.0]paracyclophane-14,21,62,71-tetraone. (colourless crystals, 9 mg, 3.5%, m.p.: 121°–124° C.); m/z (positive-ion F.A.B.M.S.) 1411 for [M+Na]$^+$, 1389 for [M+H$^+$](C$_{76}$H$_{100}$N$_4$O$_{20}$ requires M, 1388); $\delta$H (400 MHz, CDCl$_3$) 3.56–3.69 (32H,m. 16x methylene protons ), 3.70–3.74 (8H, m, 4x methylene protons) , 3.76–3.80 (8H,m, 4x methylene protons), 3.93–3.97 (8H, m, 4x methylene protons), 4.15–4.20 (8H,m,4x methylene protons), 4.52 (8H, s,—ArCH$_2$O—), 7.34 (8H,d; J=8 Hz, $\beta$-biphenyl protons), 7.48 (8H, d , J=8 Hz, $\alpha$-bihenyl protons), 7.84 (8H,s, phenyl protons).

(iii"): {[2][1,4,7,10,25,28,31,34-octaoxa-13,22-diaza[15.15.0]paracyclophane-14,21-dione][Per-2,6-O-methyl-$\beta$ cyclodextrin]-catenane}(colourless amorphous solid, 21 mg, 3%, m.p.: 176°–177° C.; m/z (positive-ion F.A.B.M.S.), 2049 for [M+2H+Na]$^+$, 1453 [M+Na]$^+$(DM$\beta$CD), 694[M]$^+$for [M-DM$\beta$CD]$^+$, C$_{94}$H$_{148}$N$_2$O$_{45}$ requires M, 2024); $\delta$H (400 MHz, CD$_2$Cl$_2$), 3.02 (7H,dd,J$_{1,2}$=3.5 Hz, J$_{2,3}$=10.0 Hz, H-2), 3.28 (21H,s, 7x 2-O—Me), 3.54 (21H,s, 7x 6-O—Me), 3.25–3.75 (60H,m, 7x H-6a, 7x H-6b, 7x H-5, 7x H-4 cyclodextin protons and 16x methylene protons), 3.83 (7H,t,J=9.5 Hz, H-3), 4.58 (2H,s,—ArCH$_2$O—), 4.62 (2H, s,—ArCH$_2$O—), 4.83 (7H,d,J$_{1,2}$=3.5 Hz, H-1), 4.98 (7H,s,OH), 7.40 (4H,2x d, J=8 Hz, $\beta$ biphenyl protons), 7.51 (4H, 2x d, J=8 Hz, $\alpha$biphenyl protons), 7.74 (2H,d,J=8 Hz, phenyl protons), 7.83 (2H,d,J=8 Hz, phenyl protons); $\delta$C (75.5 MHz, CDCl$_3$) 40.09, 40.33, 58.95, 60.27, 69.93, 0.37, 70.54, 70.69, 72.50, 72.94, 73.26, 81.92, 3.32, 101.18, 126.04, 126.43, 127.46, 127.68, 127.85, 128.00, 137.10, 137.48, 138.58, 138.94, 140.12, 166.98, 167.97.

Fraction (iv) was purified further by preparative T.L.C. on silica gel (CH$_2$Cl$_2$/MeOH, 90:10) to give three products: (iv'), (iv") and (iv'") They were characterised as:

(iv') {[2][1,4,7,10,25,28,31,34,49,52,55,58,73,76,79,82-hexadodecaoxa-13,22,61,70-tetraaza[15.15.0.15.15.0]paracyclophane-14,21,62,71-tetraone][per-2,6-O-methyl-$\beta$ cyclodextrin]-catenane}(colourless amorphous solid, 4 mg, 0.8%); m/z (positive-ion F.A.B.M.S.), 2743 for [M+2H+Na]$^+$, 2721 for [M+3H]$^+$, 1389 for [M+H-DM$\beta$CD]$^+$, 1353 for [M'+Na]$^+$(DM$\beta$CD), (C$_{132}$H$_{198}$N$_4$O$_{55}$ requires M, 2718); $\beta$H (300 MHz, CDCl$_3$), 3.23

(7H,dd,$J_{1,2}$=3.5 Hz,$J_{2,3}$=10.0 Hz,H-2),3.30 (21H,s,7x 2-O—Me, 3.59 (21H,s,7x 6-O—Me), 3.32-3.73 (92H,m, 7x H-6a, 7x H-6b, 7x H-5, 7x H-4 cyclodextrin protons and 32x —CH$_2$—), 3.89 (7H,t,J=9,5 Hz,H-3), 4.57 (4H,s,—ArCH$_2$O—), 4.61 (4H,s,—ArCH$_2$O—), 4.90 (7H,d,$J_{1,2}$=3.5 Hz,H-1), 5.05 (7H,s,OH), 7.16 (2H,broad t, CONH), 7.32 (2H,broad t, CONH), 7.39 (8H, 2x d,J=8 Hz,β-biphenyl protons), 7.53 (8H,2x d, J=8 Hz), 7.88 (8H,2x d,J=8 Hz, phenyl protons); $δC$ (75.5 MHz, CDCl$_3$) 39.98, 58.93, 60.30, 69.62, 69.80, 70.42, 70.58, 70.65, 72.95, 73.28, 82.09, 83.46, 101.22, 126.67, 126.67, 126.80, 127.26, 127.35, 128.06, 137.04, 137.28, 137.82, 139.93, 140.11, 166.22

(iv'') and (iv''')
{[3][1,4,7,10,25,28,31,34,49,52,55,58,73,76,79,82-hexadodecaoxa-13,22,61,70-tetraaza[15.15.0.15.15.0]paracyclophane-14,21,62,71-tetraone]Bis-[per-2,6-O-methyl-β cyclodextrin]-catenane} ("head to head" and "head to tail" isomers): (colourless amporphous solid, 39 mg); m/z (positive-ion F.A.B.M.S.), 4072 for [M+H+Na]$^+$, 2742 for [M+H+NaDMβCD]$^+$, 1389 for [M+H-2x DMβCD]$^+$, 1353 for [M'+Na]$^+$(DMβCD), (C$_{188}$H$_{296}$N$_4$O$_{90}$ requires M, 4048); δH (300 MHz, CDCl$_3$), 3.24 (14H,dd,$J_{1,2}$=3.5 Hz,$J_{2,3}$=10 Hz,H-2), 3.25 (14H,dd,$J_{1,2}$=3.5 Hz,$J_{2,3}$=10 Hz,H-2') 3.31 (84H,s, 14x 2-O—Me and 14x 2-O—Me'), 3.61 (42H,s,14x 6-O—Me), 3.62 (42H,s,14x 6-O—Me') 3.28-3.78 (176H,m, 14x H-6a and 14x H-6a', 14x H-6b and 14x H-6b', 14x H-5 and 14x H-5', 14x H-4 and 14x H-4' CD protons, 32x —CH$_2$-protons and 32x CH$_2$-protons ), 3.90 (28H,t,J=9.5 Hz, H-3 and H-3'), 4.59 (4H,s,—ArCH$_2$O—) 4.62 (8H,s,—ArCH$_2$O'—), 4.65 (4H,s,ArCH$_2$O—), 4.93 (28H,d,$J_{1,2}$=3.5 Hz, H-1 and H-1'), 5.08 (28H,s,OH and OH'), 7.04 (2H,broad t,CONH), 7.13 (6H,broad t,CONH and CONH'), 7.40 (16H,3x d,J=8 Hz,β-biphenyl and β'-biphenyl protons), 7.53 (16H,3x d,J=8 Hz,α-biphenyl and (α'-biphenyl protons), 7.88 (8H,s,phenyl' protons), 7.89 (8H, 2x d, J=8 Hz, phenyl protons); $δC$ (75.5 MHz, CDCl$_3$) 39.97, 58.96, 60.35, 69.70, 69.87, 70.38, 70.54, 70.73, 72.81, 73.26, 82.04, 83.41, 101.21, 126.45, 127.31, 127.99, 137.0, 137.8, 139.7, 166.6.

Example 2

1,4,7,10,31,34,37,40-Octaoxa-13,28-diaza[15,0,15,0-]paracyclophane-14,27-dione and {[2][1,4,7,10,31,34,37,40-Octaoxa-13,28-diaza{15,0,15,0-]paracyclophane-14,27-dione][per-2-6-O-methyl-β cyclodextrin]-catenane}

A mixture of 4,4'-bis{-1,1-[2-(2-(2-(2-aminoethoxy)ethoxy)ethoxy)ethoxy]methylene]-1,1'-biphenyl (0.2 g, 0.354 mmol), pure DMβCD (0.5 g, 0.375 mmol) and NaOH (0.04 g, 1 mmol) in distilled water (100 ml) was sonicated for 2 h at room temperature. To this solution was then added powdered 4,4'-biphenyldicarboxylic acid chloride (0.091 g, 0.356 mmol) while keeping the temperature below 5° C. The suspension was sonicated for a further 2 h at room temperature. The reaction mixture was extracted with CHCl$_3$. (3x 75 ml). The organic extract was washed with dilute HCl (50 ml), water (100 ml) and finally dried over MgSO$_4$. Removal of the solvent under reduced pressure gave a colourless solid containing mainly per-2,6-O-methyl-β cyclodextrin which was purified by chromatography on silica gel (CH$_2$Cl$_2$/Acetone/MeOH, 75:18:7) to afford three fractions. They were characterised as ( i ) per-2,6-O-methyl-β cyclodextrin (ii) 1,4,7,10,31,34,37,40,-octaoxa-13,28-diaza [15,0,15,0]paracyclophane-14,27-dione (colourless solid, 60 mg. 22%, m.p.: 173°-174° C.); m/z (positive-ion F.A.B.M.S), 819 for [M+K]$^+$, 793 for [M+Na]$^+$, 771 for [M+H]$^+$, (C$_{44}$H$_{54}$O$_{10}$N$_2$ requires M,770); δH (300 MHz, CDCl$_3$) 3.61-3.70 (32H,m, 14x —CH$_2$O— and 2x CH$_2$NHCO—, 7.28 (4H,d,J=8 Hz, β-biphenyl protons of 4,4'-biphenyldicarboxylyl unit), 7.32 (4H,d,J=8 Hz, α-biphenyl protons of 4,4'-biphenyldicarboxylyl unit), 7.39 (4H,d,J=8 Hz,β-biphenyl protons of 4,4'-bismethylenebiphenyl unit), 7.46 (2H, broad t, NHCO) 7.83 (4H,d,J=8 Hz,α-biphenyl protons of 4,4'-bismethylenebiphenyl unit), $δC$ (75.5 MHz, CDCl$_3$) 39.95, 69.48, 70.00, 70.21, 70.55, 70.59, 70.66, 70.68, 72.86, 126.88, 127.73, 128.19, 133.71, 137.19, 139.93, 142.71, 166.99.

(iii) {[2][1,4,7,10,31,34,37,40,-octaoxa-13,28-diaza[15,0,15,0]paracyclophane-14,27-dione][per-2,6-O-methyl-β cyclodextrin]-catenane} (colourless solid, 20 mg, 2.7%);m/z (positive-ion F.A.B.M.S.), 2123 for [M+Na]$^+$, 2101 for [M+H]$^+$, 1353 for [M'+Na]$^+$ (DMβCD), 771 for [M-DMβCD+H]$^+$, C$_{100}$H$_{152}$N$_2$O$_{45}$ requires M, 2100); δH (300 MHz, CHCl$_3$), 3.11 (7H,dd,$J_{1,2}$=3.5 Hz, $J_{2,3}$=10.0 Hz, H-2), 3.31 (21H,s, 7x 2-O—Me), 3.57 (21H, s, 7x 6-O—Me), 3.25-3.78 (60H, m, 7x H-6a, 7x H-6b, 7x H-5, 7x H-4 cyclodextrin protons and 16x methylene protons), 3.85 (7H,t,J=9.5 Hz,H-3), 4.59 (2H,s,—ArCH$_2$O—), 4.68 (2H,s,—ArCH$_2$O—), 4.86 (7H,d,$J_{1,2}$=3.5 Hz, H-1), 5.04 (7H,s, OH), 7.06 (1H,br.t,NHCO), 7.40 (4H,2x d,J=8 Hz, β-biphenyl protons of 4,4'-biphenyldicarboxylyl unit), 7.53 (4H,2x d,J=8 Hz, α-biphenyl protons of 4,4'-biphenyldicarboxylyl unit), 7.57 (1H,br.t.NHCO), 7.68 (4H,d,J=8 Hz, β-biphenyl protons of 4,4'-bismethylenebiphenyl unit), 7.90 (4H, 2x d,J=8 Hz, α-biphenyl protons of 4,4'-bismethylenebiphenyl unit), $δC$ (75.5 MHz, CDCl$_3$) 39.97, 40.02, 58.98, 60.33, 70.34, 70.45, 70.61, 70.70, 72.87, 73.16, 73.28, 82.01, 83.41, 101.21, 126.31, 126.57, 127.13, 127.42, 127.91, 134.29, 134.37, 137.91, 138.83, 139.72, 140.26, 143.25, 143.38, 167.43, 167.57.

Example 3

3,6,9-Trioxaundecane-1,11-diylbis-(toluene-p-sulphonate)

Sodium hydroxide (80 g, 2.0 mol) dissolved in water (400 ml) and tetraethylenglycol (135.96 g, 0.7 mol) in THF (400 ml) were placed in a flask and the mixture was cooled on an ice-bath with good stirring. To the mixture was added dropwise p-toluenesulphonyl chloride (293 g, 1.56 mol) in THF (400 ml) over 2 h with continuous stirring and cooling of the mixture below 5° C. The solution was stirred at 0°-5° C. for an additional 2 h, and then poured into ice-water (1l). The mixture was extracted twice with dichloromethane (3×200 ml). The combined organic extracts were washed twice with water (2×100 ml) and once with brine (100 ml) before being dried over MgSO$_4$. Removal of the solvent under reduced pressure afforded 3,6,9-trioxaundecane-1,11-diylbis-(toluene-p-sulphonate) as a colourless oil (348 g, 91%); m/z (positive-ion F.A.B.M.S. 502 for [M]$^+$, (C$_{22}$H$_{30}$O$_9$S$_2$ requires M, 502); δH (300 MHz, CDCl$_3$)

2.42 (6H,s,C$_6$H$_4$—CH$_3$), 3.50–3.56 (8H,m,γ- and δ-OCH$_2$), 3.65 (4H,t, β-OCH$_2$), 4.12 (4H,t,α-OCH$_2$), 7.35 (4H,d,BB' part of AA'BB' system, C$_6$H$_4$), and 7.78 (4H,d,AA' part of AA'BB' system, C$_6$H$_4$).

1,11-Diphthaloylamino-3,6,9-trioxaundecane

To a stirred solution of 3,6,9-trioxaundecane-1,11-diylbis-(toluene-p-sulphonate) (50.3 g, 0.1 mol) in dry DMF (250 ml), was added powdered potassium phthalimide (44.45 g, 0.24 mol) under atmosphere of nitrogen. The reaction mixture was stirred for 7 h at 90° C. The product was precipitated by pouring the reaction mixture into ice-water (750 ml). The precipitate was then filtered and subsequently washed with NaOH (0.1N) and water. The raw product was recrystallised twice in ethanol to afford 1,11-diphthaloylamino-3,6,9-trioxaundecane as a colourless solid (36.60 g, 81%, m.p.: 104°–105° C.): m/z (E.I.M.S.), 452, (C$_{24}$H$_{24}$O$_7$N$_2$); δH (300 MHz, CDCl$_3$) 3.51–3.60 (8H,m,γ- and δ-OCH$_2$), 3.71 (4H,t,β-OCH$_2$), 3.88 (4H,t, α-NCH$_2$), 7.72 (4H, m, o-phthaloyl protons), 7.84 (4H,m, m-phthaloyl protons).

1,11-Diamino-3,6,9-trioxaundecane

A mixture of 1,11-diphthaloylamino-3,6,9-trioxaundecane (26 g, 0.0572 mol) and hydrazine hydrate (6.8 ml, 0.126 mol) in ethanol (100 ml) was refluxed for 2 h. After cooling to room temperature, HCl 6N (23.3 ml) was added The reaction mixture was refluxed for a further 1H. After cooling, it was filtered and the solid washed with ethanol. The filtrate was evaporated to dryness under reduced pressure. Distilled water (2 ml) and KOH (11.5 g) were added to the residue which was extracted several times with dioxane (100 ml). The organic extract was dried over KOH (pellets). Removal of the solvent under reduced pressure gave a yellow oil which was distilled under high vacuum to afford 1,11-diamino-3,6,9-trioxaundecane as a colourless oil; (8.7 g, 79%, b.p.: 115° C. (0.2 mbar)); m/z (E.I.M.S.), 193, (C$_8$H$_{10}$N$_2$O$_3$ requires M, 192); δH (300 MHz, CDCl$_3$) 1.80 (4H, broad s,NH$_2$), 2.87 (4H,t, α-NCH$_2$), 3.51 (4H,t,β-OCH$_2$), 3.59–3.70 (8H,m,γ- and δ-OCH$_2$)

4,4'-Bis{-1,1-[2-(2-(2-(2-aminoethoxy)ethoxy)ethoxy)ethylamino]carbonyl}-1,1'-biphenyl To a solution of 1,11-diamino-3,6,9-trioxaundecane (5.14 g, 0.028 mol) and triethylamine (9 ml) in CH$_2$Cl$_2$ (20 ml) was added 4,4'-biphenyldicarboxylic acid chloride (1.8 g, 7.05.10$^{-3}$ mol) dropwise over 4 h with vigorous stirring. The mixture was stirred for an additional 16 h at room temperature before being respectively washed with NaOH 1N (3×100 ml) and brine (50 ml). The organic solution was evaporated to dryness. Water (50 ml) was added to the residue. The resulting suspension was filtered over Celite and the filtrate extracted with CH$_2$Cl$_2$ (3×50 ml). Drying of the organic extract and removal of the solvent under reduced pressure gave a product which was subjected to column chromatography on silica gel (CHCl$_3$/MeOH/NH$_4$OH, 45:9:1) to afford (1.3 g, 31%, m.p.: 107°–108° C.); m/z (positive-ion F.A.B.M.S.), 613 for [M+Na]$^+$, 591 for [M+H]$^+$, (C$_{30}$H$_{46}$O$_8$N$_4$ requires 590); δH (300 MHz, CDCl$_3$), 1.86 (4H, broad s, NH$_2$), 3.49 (4H,t,—CH$_2$NH$_2$), 3.60–3.72 (28H,m, —OCH$_2$— and —CH$_2$NHCO—), 7.66 (4H,d,β-biphenyl protons), 7.69 (2H,broad t, CONH), 7.95 (4H,d,α-biphenyl protons).

1,4,7,22,25,28-Hexaoxa-10,19,31,46-tetraaza[15,15,0-]paracyclophane-11,18,32,45-tetraone and {[2][1,4,7,22,25,28-Hexaoxa-10,19,31,46-tetraaza[15,15,0]paracyclophane-11,18,32,45-tetraone][per-2 6-O-methyl-β cyclodextrin]-catenane }

A mixture of 4,4'-bis{-1,1-[2-(2-(2-(2-aminoethoxy)ethoxy)ethoxy)ethylamino]carbonyl}-1,1'-biphenyl (0.2 g, 0.338 mmol), pure DMβCD (0.5 g, 0.375 mmol) and NaOH (0.04 g, 1 mmol) in distilled water (100 ml) was sonicated for 2 h at room temperature. To this solution was then added powdered terephathaloyl chloride (0.069 g, 0.338 mmol) while keeping the temperature below 5° C. The suspension was sonicated for a further 2 h at room temperature. The reaction mixture was extracted with CHCl$_3$ (3x 75 ml). The organic extract was washed with HCl dil, (50 ml), water (100 ml) and finally dried over MgSO$_4$. Removal of the solvent under reduced pressure gave a colourless solid containing mainly Per-2,6-O-methyl-β cyclodextrin which was purified by chromatography on silica gel (CHCl$_3$/MeOH, 93:7) to afford three fractions. They were characterised as (i) per-2,6-O-methyl-β cyclodextrin (ii) {[2][1,4,7,22,25,28-hexaoaxa-10,19,31,46-tetraaza[15,15,0]paracyclophane-11,18,32,45-tetraone][per-2,6-O-methyl-β cyclodextrin]-catenane}, (colourless solid, 5 mg, 0.5%), m/z (positive-ion F.A.B.M.S.), 2083 for [M+CH$_3$OH+H]$^+$, 1353 for (M'+Na]$^+$(DMβCD), 721 for [M-DMβCD+H]$^+$; (C$_{94}$H$_{146}$N$_4$O$_{45}$ requires M, 2050); δH (300 MHz, CDCl$_3$), 3.12 (7H,dd,J$_{1,2}$=3.5 Hz, J$_{2,3}$=10.0 Hz, H-2), 3.35 (21H,s, 7x 22-O—Me), 3.59 (21H,s, 7x 6-O—Me), 3.32–3.73 (92H,m, 7x H-6a, 7x H-6b, 7x H-5, 7x H-4 cyclodextrin protons and 32x —CH$_2$—) 3.82 (7H,t,J=9,5 Hz, H-3), 4.57, 4.87 (7H,d,J$_{1,2}$=3.5 Hz, H-1), 5.04 (7H,s, OH), 7.23 (2H,broad t, CONH), 7.37 (1H, broad t, CONH), 7.48 (1H, broad t, CONH), 7.63 (4H, 2x d,J=8 Hz,β-biphenyl protons), 7.85 (8H, 2x d,J=8 Hz, phenyl protons) 7.92 (4H, 2x d,J=8 Hz, δ-biphenyl protons).

(iii) 1,4,7,22,25,28-hexaoxa-10,19,31,46-tetraaza[15,15,0]paracyclophane-11,18,32,45-tetraone, (63 mg, 22%, m.p.: 260°–261° C.), m/z (F.A.B.M.S.), 743 for [M+Na]$^+$, 721 for [M+H]$^+$; (C$_{38}$H$_{146}$N$_4$O$_{45}$ requires M, 720); δH (300 MHz, CDCl$_3$), 3.55–3.80 (32H,m,—CH$_2$), 6.78 (2H, br.t, NHCO), 7.17 (2H, broad t, NHCO), 7.56 (4H,d,J=8 Hz, α-biphenyl protons), 7.86 (4H, d,J=8 Hz,β-biphenyl protons).

We claim:

1. A cyclodextrin catenane comprising one or two per-2,6-di-O-alkyl-β-cyclodextrin macrocycles and another macrocycle wherein each per-2,6-di-O-alkyl-β cyclodextrin macrocycle is interpenetrated by the other macrocycle which has the formula

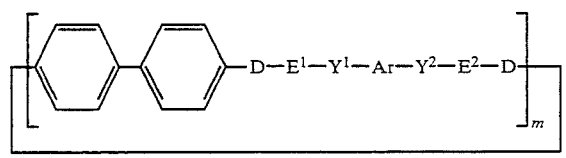

wherein
D represents —CH$_2$— or —CO—;
E$^1$ represents —(XCH$_2$CH$_2$)$_n$—;
E$^2$ represents —(CH$_2$CH$_2$X)$_n$—;
each X independently represents —O— or —NR—;
Y$^1$ represents —NRCO—, NRSAO$_2$—, —SCO— or —SSO$_2$—;

$Y^2$ represents —CONR—, $SO_2NR$—, —COS—, or —$SO_2S$—;

R represents hydrogen or alkyl;

Ar is an aromatic group;

n is an integer from 4 to 6; and, m is 1 or 2, provided that when the catenane comprises two per-2,6-di-O-alkyl-β-cyclodextrin macrocycles then m is 2.

2. A compound according to claim 1 wherein Ar represents a substituted or unsubstituted arylene, bisarylene or arylenealkylenearylene group.

3. A compound according to claim 2 wherein Ar is a phenylene, naphthylene, biphenylene or phenylenemethylenephenylene group.

4. A compound according to claim 1 wherein D represents —$CH_2$—, each X represents —O—, $y^1$ represents —NHCO—, $y^2$ represents —CONH—, Ar represents 1,4-phenylene or 4,4'-biphenylene, n is 4 and m is 1.

5. A compound according to claim 1 wherein D represents —CO—, $E^1$ is —($NHCH_2CH_2$)($OCH_2CH_2$)$_3$—, $E^2$ is —($CH_2CH_2O$)$_3$($CH_2CH_2NH$)—, $Y^1$ represents —NHCO—, $Y^2$ represents —CONH—, Ar represents 1,4-phenylene and m is 1.

6. A method of preparing a compound according to claim 1 which comprises reacting, in aqueous solution, (a) per-2,6-di-O-alkyl-β-cyclodextrin, (b) a compound having the formula

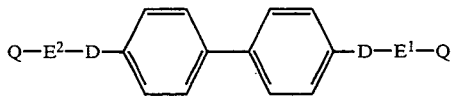

wherein Q represents —NHR or —SH, and (c) a compound having the formula Z—Ar—Z wherein Z represents —COCl or —$SO_2Cl$, wherein (a), (b), and (c) are employed in substantially equimolar amounts, and the reaction is carried out in aqueous solution at pH 10–11, at room temperature.

7. A method according to claim 6 wherein Q is —$NH_2$ and Z is —COCl.

* * * * *